(12) United States Patent
Yasuda

(10) Patent No.: US 7,669,046 B2
(45) Date of Patent: Feb. 23, 2010

(54) DATA PROCESSING APPARATUS AND FIRMWARE UPDATE METHOD

(75) Inventor: Kei Yasuda, Nishinomiya (JP)

(73) Assignee: Panasonic Corporation, Kadoma (JP)

( * ) Notice: Subject to any disclaimer, the term of this patent is extended or adjusted under 35 U.S.C. 154(b) by 380 days.

(21) Appl. No.: 11/194,399

(22) Filed: Aug. 1, 2005

(65) Prior Publication Data

US 2006/0031666 A1 Feb. 9, 2006

(30) Foreign Application Priority Data

Aug. 3, 2004 (JP) ............................. 2004-226486

(51) Int. Cl.
G06F 15/177 (2006.01)
(52) U.S. Cl. ........................................................ 713/2
(58) Field of Classification Search ...................... 713/2
See application file for complete search history.

(56) References Cited

U.S. PATENT DOCUMENTS

| | | | |
|---|---|---|---|
| 6,253,281 B1 | 6/2001 | Hall | |
| 6,584,559 B1 * | 6/2003 | Huh et al. | 713/2 |
| 6,671,060 B1 * | 12/2003 | Fresk et al. | 358/1.15 |
| 7,143,275 B2 * | 11/2006 | Cepulis et al. | 713/1 |
| 7,181,458 B1 * | 2/2007 | Higashi | 707/100 |
| 7,197,634 B2 * | 3/2007 | Kruger et al. | 713/1 |
| 7,334,121 B2 * | 2/2008 | Lee | 713/2 |

FOREIGN PATENT DOCUMENTS

| | | |
|---|---|---|
| CN | 1097225 C | 12/2002 |
| JP | 08-249016 | 9/1996 |
| JP | 08-255083 | 10/1996 |
| JP | 10-161881 | 6/1998 |
| JP | 11-184758 A | 7/1999 |
| JP | 11-282688 | 10/1999 |
| JP | 2000-181719 | 6/2000 |
| JP | 2002-152650 | 5/2002 |

OTHER PUBLICATIONS

Chinese Office Action for corresponding Application No. 200510091039.X dated May 18, 2007.
Notice of Reasons for Rejection for corresponding Japanese Application No. 2005-220320 dated Sep. 2, 2008 (with English translation).
Notice of Reasons for Rejection for corresponding Japanese Application No. 2005-220320 dated Nov. 24, 2009 (with English translation).

* cited by examiner

*Primary Examiner*—Thomas Lee
*Assistant Examiner*—Eric Chang
(74) *Attorney, Agent, or Firm*—Renner, Otto, Boisselle & Sklar, LLP

(57) ABSTRACT

The data processing apparatus of the present invention includes a memory having a first firmware stored therein; a receiving section for receiving a second firmware; a processor for executing update processing for updating the first firmware in the memory into the second firmware; and a drive for writing the second firmware onto a removable storage medium. A successfully updated firmware is stored on the removable storage medium. Therefore, after the firmware is further updated and, however, the updated version of firmware needs to be recovered, such firmware can be promptly and easily recovered from the storage medium.

8 Claims, 3 Drawing Sheets

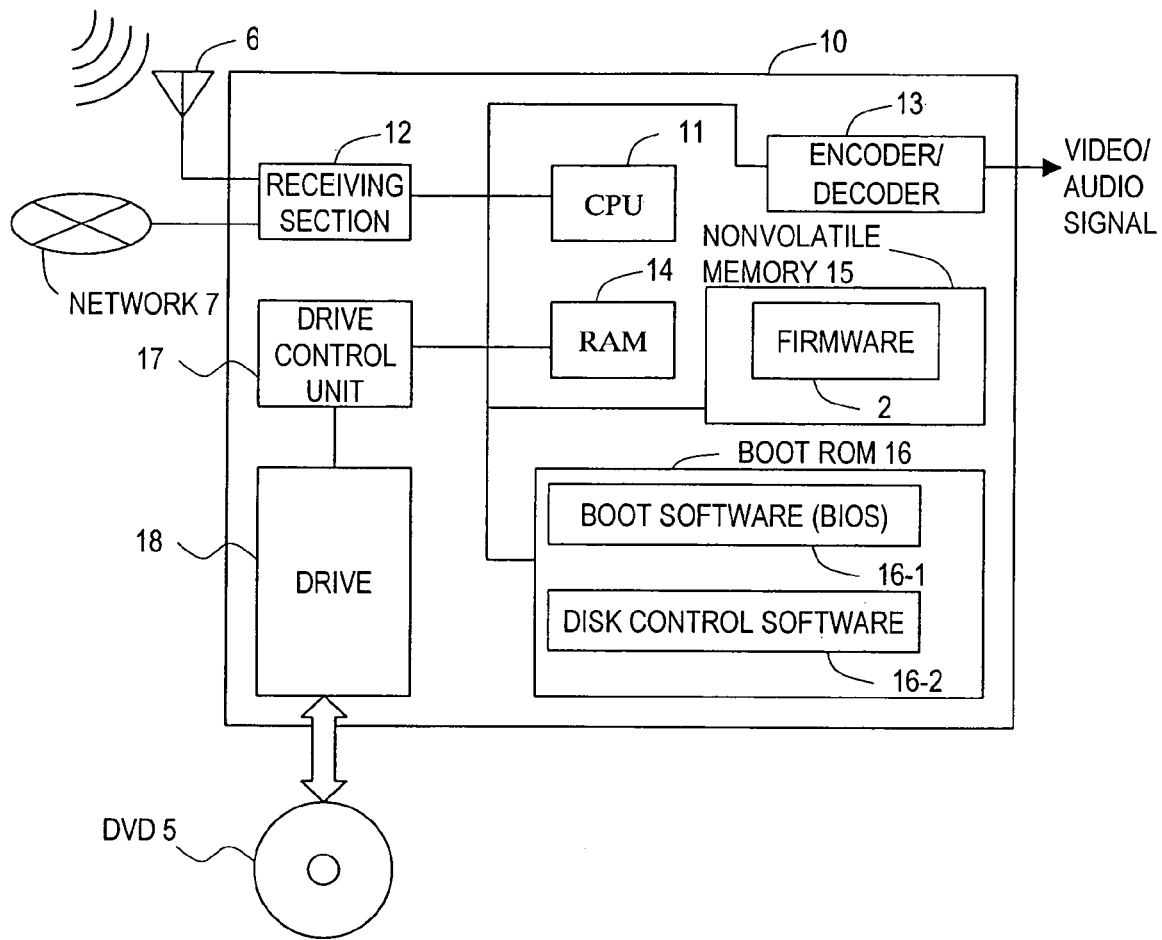

DATA PROCESSING APPARATUS AND FIRMWARE UPDATE METHOD

BACKGROUND OF THE INVENTION

1. Field of the Invention

The present invention relates to a technology for rewriting a firmware in a device which executes the firmware to realize inherent functions thereof, and more particularly relates to a technology for rewriting a firmware in a home-use electronic device, such as a DVD recorder or the like, capable of obtaining the firmware using a removable storage medium, network, broadcast wave or the like.

2. Description of the Related Art

Devices such as DVD recorders or the like generally realize inherent functions thereof, using a firmware stored in a nonvolatile memory. The firmware may be updated into a new version when, for example, a bug is corrected or a new function is added. For example, Japanese Laid-Open Patent Publication No. 08-255083 discloses a technology for updating an existing firmware in a device into a new version.

In general, devices such as DVD recorders or the like perform version-up of (i.e., update the version of) a firmware included therein, using a media update function. The media update function is to read a new firmware from a removable storage medium such as a DVD or the like, write the firmware onto a nonvolatile memory, and thus update the firmware.

Some of the recently developed devices also have a network update function. The network update function is to obtain a new firmware using a broadcast wave or a data communication network, write the new firmware onto a nonvolatile memory, and thus update the firmware. The processing for obtaining and updating the firmware is executed with no involvement of the user.

The update processing of the firmware is generally automated and very rarely fails, but there is still a possibility of failure. When the firmware update fails, the firmware cannot be executed and so the functions of the device stop being provided.

There are other cases where the firmware cannot be normally executed even if the firmware update does not fail. Such cases are, for example, when the firmware has one or more bugs, the firmware is destroyed due to a program glitch, the parameters of the firmware are rewritten by an untrustworthy program. Furthermore, there is a case where the parameters of the firmware are set in an incorrect manner due to an unexpected operation of the user. This is because the user needs to set parameters to his or her home appliance (e.g. a DVD recorder) which has become complicated in software function and operation just like a PC. Also, the user needs to operate the appliance in combination with his or her PC. In each case noted above, the functions of the device stop being provided.

In many cases where the firmware is not normally executed, the only step the device can take is to use the media update function to rewrite the existing firmware with executable firmware. Even if the device has a network update function, such a function cannot be used in most of the cases for the following reason. Although the device is designed such that at least drives and the like thereof operate in such cases, the section for receiving a broadcast wave or the like does not necessarily operate. Namely, the network update function is not suitable for recovering firmware.

In a situation where the media update function needs to be used for recovery of the firmware, for example, the device cannot possibly be used for an extended period of time. The reason is that the user has to wait until a storage medium having executable firmware stored therein becomes available.

For example, when the user requests a service center or the like for a DVD having the firmware storing therein, the DVD is sent by the conventional mail and it takes several days to several weeks for the DVD to be delivered to the user. In addition, a monetary burden is imposed on the user. Especially when the service center does not have any stock of the DVD, the service center has to order the DVD from the manufacturer, which further extends the time required until the user obtains the DVD. Generally, service centers have DVDs sent from the manufacturer or the like in stock but do not create the DVDs themselves. Such a situation also keeps the user waiting unable to use the device for an extended period of time.

It is preferable that the user can get the firmware back to normal as soon as possible, in the case where the user set an inappropriate parameter. In the near future, the user must set many types of parameters, each of which takes a wider range of values, to a home appliance such as a DVD recorder like a PC. Also, each range of parameter values becomes large. It is neccessary to consider that the user may set unexpected parameters due to a lot of flexible settings.

SUMMARY OF THE INVENTION

In order to overcome the problems described above, preferred embodiments of the present invention provide rapid and easy recovery of firmware, which is capable of allowing the device to normally operate.

Other features, elements, processes, steps, characteristics and advantages of the present invention will become more apparent from the following detailed description of preferred embodiments of the present invention with reference to the attached drawings.

A data processing apparatus according to the present invention includes a memory having a first firmware stored therein; a receiving section for receiving a second firmware; a processor for executing an update processing for updating the first firmware in the memory into the second firmware; and a drive for writing the second firmware onto a removable storage medium.

When the update processing into the second firmware has been successful, the processor may output a write instruction signal; and in response to the write instruction signal, the drive may write the second firmware onto the storage medium.

The data processing apparatus may further comprise a temporary memory for temporarily storing the second firmware therein. The processor may rewrite the first firmware in the memory with the second firmware stored in the temporary memory; and the drive may write the second firmware stored in the temporary memory onto the storage medium.

Before the processor executes the update processing, the drive may write the first firmware stored in the memory onto the storage medium. After the execution of the update processing is completed, the processor may compare the post-rewriting firmware in the memory and the second firmware in the temporary memory, and may output the write instruction signal when the comparison result shows that the post-rewriting firmware matches the second firmware.

When the update processing into the second firmware has been unsuccessful, the processor may output a read instruction signal. In response to the read instruction signal, the drive may read the first firmware written on the storage medium. The processor may write the first firmware onto the memory.

The receiving section may receive the second firmware using at least either one of a broadcast wave and a data communication network.

The drive may write the second firmware onto at least either one of an optical disk and a semiconductor memory loaded into the data processing apparatus.

When the storage medium is removed from, and then a new storage medium is loaded, the data processing apparatus, the drive may write the second firmware onto the newly loaded storage medium.

When a storage medium having the second firmware written thereon is loaded into the data processing apparatus, the drive may read the second firmware from the storage medium, and the processor may write the read second firmware onto the memory.

A firmware update method according to the present invention updates a first firmware stored in a memory into a second firmware. The method includes the steps of receiving the second firmware; executing an update processing for updating the first firmware in the memory into the second firmware; and writing the second firmware onto a removable storage medium.

According to the present invention, a current version of firmware is stored on a removable storage medium. Therefore, even if the user sets an incorrect parameter to the firmware after the firmware has normally updated, such a normal and current firmware can be rapidly and easily recovered from the storage medium. Owing to such an arrangement, the user can immediately recover the current version of firmware and continue using the device without any need of ordering the firmware from a service center.

BRIEF DESCRIPTION OF THE DRAWINGS

FIG. 2 shows a hardware structure of a DVD recorder 10 according to one embodiment of the present invention.

DETAILED DESCRIPTION OF PREFERRED EMBODIMENTS

Hereinafter, preferred embodiments of a data processing apparatus according to the present invention will be described with reference to the accompanying drawings.

In one embodiment of the present invention, the data processing apparatus is a DVD recorder. The DVD recorder is capable of downloading a new version of firmware from a data communication network, a broadcast wave or the like and thus updating the existing old version of firmware into the new version of firmware. The DVD recorder is also capable of reading new version of firmware from a DVD, which is a removable storage medium, and thus rewriting the old version of firmware with the new version of firmware. Hereinafter, a new version of firmware will be referred to as "new firmware", and an existing old version of firmware will be referred to as "previous firmware".

Hereinafter, a firmware in this embodiment will be first described, and then a structure and operation of the DVD recorder in this embodiment will be described.

Figure 1A:
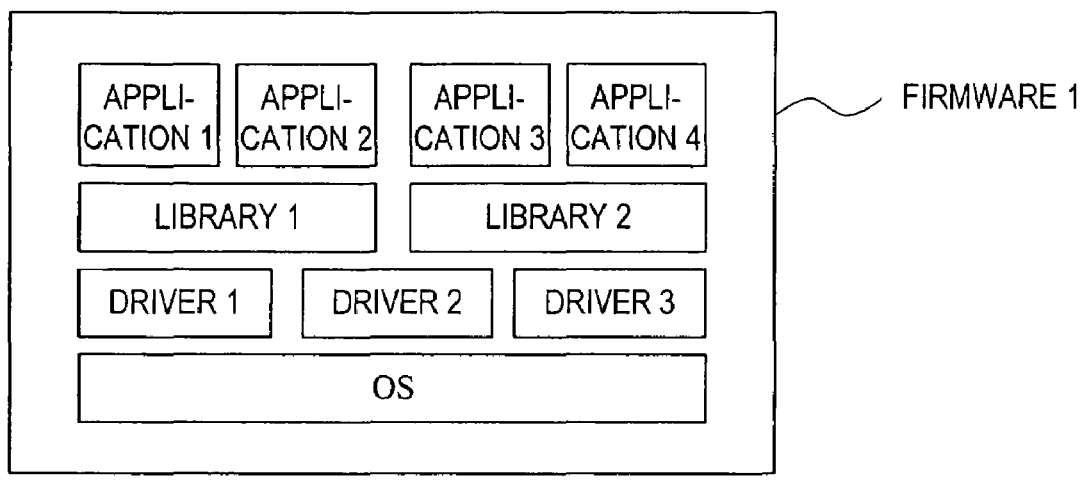
FIG. 1A shows a structure of general firmware 1 including a plurality of programs.

In general, a "firmware" refers to a software for controlling the operation of devices. The firmware includes a plurality of programs. FIG. 1A shows a structure of general firmware 1 including a plurality of programs. The firmware 1 shown in FIG. 1A includes an operating system (OS), driver 1, driver 2 and driver 3 for controlling elements of the device, library 1 and library 2, and application 1, application 2, application 3 and application 4 for providing various services (functions). The programs are each provided as an independent program and are integrated as one piece of firmware 1.

Figure 1B:
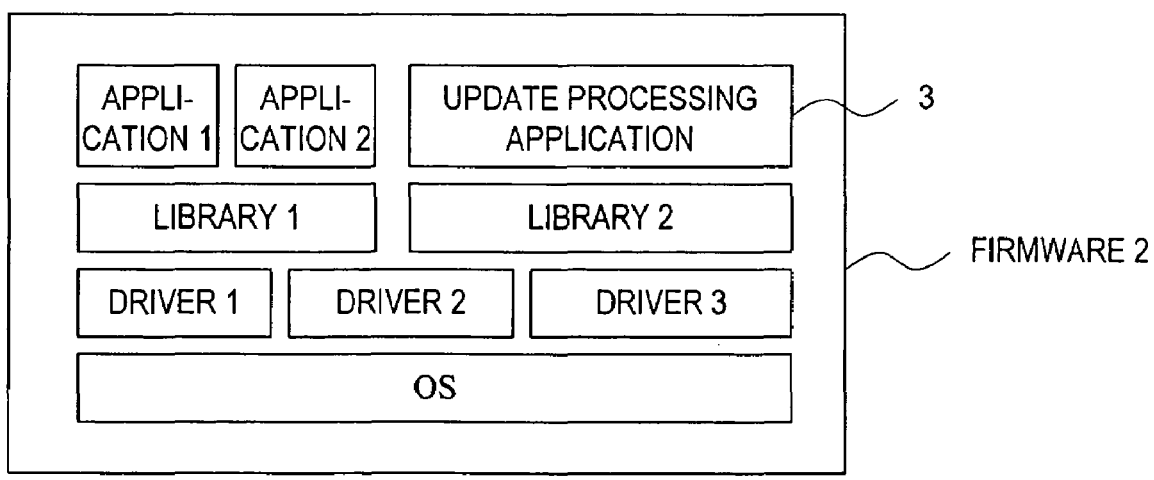
FIG. 1B shows a logical structure of firmware 2 according to one embodiment of the present invention.

FIG. 1B shows a logical structure of firmware 2 according to this embodiment. The firmware 2 controls an operation of the DVD recorder according to this embodiment. The firmware 2 includes an update processing application 3 corresponding to the application(s) shown in FIG. 1A. The functions provided by the update processing application 3 will be described later. The types and number of the programs including the applications, libraries, drivers and the like included in the firmware 2 shown in FIG. 1B are merely exemplary, and the present invention is not limited thereto.

FIG. 2 shows a hardware structure of the DVD recorder according to this embodiment (indicated by reference numeral 10). The DVD recorder 10 includes a central processing unit (CPU) 11, a receiving section 12, an encoder/decoder 13, a RAM 14, a nonvolatile memory 15, a boot ROM 16, a drive control unit 17, and a drive 18.

The DVD recorder 10 is capable of writing data onto a DVD-RAM 5 (hereinafter, referred to simply as the "DVD 5") and/or reading data from the DVD 5. The data is, for example, an MPEG-2 program stream regarding a broadcast program.

The DVD recorder 10 according to this embodiment is also capable of writing the previous firmware onto the DVD 5 and reading the previous firmware when necessary, and then updating the previous firmware in the DVD recorder 10 into new firmware. Such update processing is realized by the update processing application 3 included in the firmware 2.

Hereinafter, the outline of the update processing performed by the DVD recorder 10 will be described. For updating the firmware for the first time, the DVD recorder 10 writes the previous firmware (in this case, the firmware set in the DVD recorder 10 at the time of shipping from the plant) onto the DVD 5. Then, the DVD recorder 10 rewrites the previous firmware therein with the new firmware.

After rewriting the firmware, the DVD recorder 10 checks whether or not the rewriting has been successful. When the rewriting has been successful, the DVD recorder 10 writes the new firmware onto the DVD 5. Thus, the update of the firmware is completed. When the rewriting has been unsuccessful, it is so displayed and the processing is terminated.

When the rewriting of the firmware results in a failure or the new firmware is found to be inexecutable due to a bug, it is necessary to recover the previous firmware. This is possible using the previous firmware written on the DVD 5. When the user loads the DVD 5 into the DVD recorder 10, the DVD recorder 10 reads the previous firmware from the DVD 5. Then, the inexecutable firmware in the DVD recorder 10 is rewritten with the previous firmware. Thus, the recovery of the firmware is completed.

When the firmware is bugged, the DVD recorder 10 cannot provide main functions thereof including recording and reproduction of video/audio data. However, the DVD recorder 10 is designed such that at least the drives and the like can operate even in such a case as described later. Therefore, once the DVD 5 is loaded, the DVD recorder 10 can perform the processing of reading the previous firmware for firmware recovery.

Hereinafter, each element of the DVD recorder 10 will be described, and then the firmware update processing performed by the DVD recorder 10 will be described.

The CPU 11 controls the operation of the DVD recorder 10 based on one or more software. The software is not limited to the firmware 2, and includes boot software (BIOS) 16-1 and disk control software 16-2 described later.

The receiving section 12 receives a broadcast wave using an antenna 6 and obtains the new firmware. The receiving section 12 can also obtain the new firmware from a data communication network 7 such as the Internet or the like. The receiving section 12 is generally provided for receiving a broadcast wave as a target of recording; this will not be described in detail in this embodiment.

The encoder/decoder 13 is a circuit for generating an MPEG-2 program stream from the data of a broadcast program, or processing the data in the reverse way to output video/audio signals.

The RAM 14 is a volatile memory used by the CPU 11 to deploy software in order to execute the software. The RAM 14 is also used to temporarily store the received firmware, data to be written onto the DVD 5, and the like.

The nonvolatile memory 15 has the firmware 2 stored therein. The nonvolatile memory 15 is, for example, an EEPROM, which is electrically rewritable.

The boot ROM 16 is a read only memory having the boot software (BIOS) 16-1 and the disk control software 16-2 stored therein.

The drive control unit 17 is hardware for controlling the operation of the drive 18.

The drive 18 writes data onto the DVD 5 loaded into the DVD recorder 10 and reads data from the DVD 5 based on the control of the drive control unit 17.

The DVD recorder 10 operates as follows when being started. When the power of the DVD recorder 10 is turned on, the CPU 11 executes the boot software 16-1 of the boot ROM 16. As a result, the firmware 2 is loaded from the nonvolatile memory 15 to the RAM 14. The CPU 11 executes various drivers, libraries, and applications included in the firmware 2. When these programs are normally executed, the recording function, the reproduction function and the like of the DVD recorder 10 become usable. When these programs are not normally executed, the CPU 11 may execute the disk control software 16-2 to provide the above-mentioned functions using the programs stored on the DVD 5.

Next, with reference to FIG. 3, the operation of the DVD recorder 10 for executing the update processing application 3 included in the firmware 2 will be described.

Figure 3:
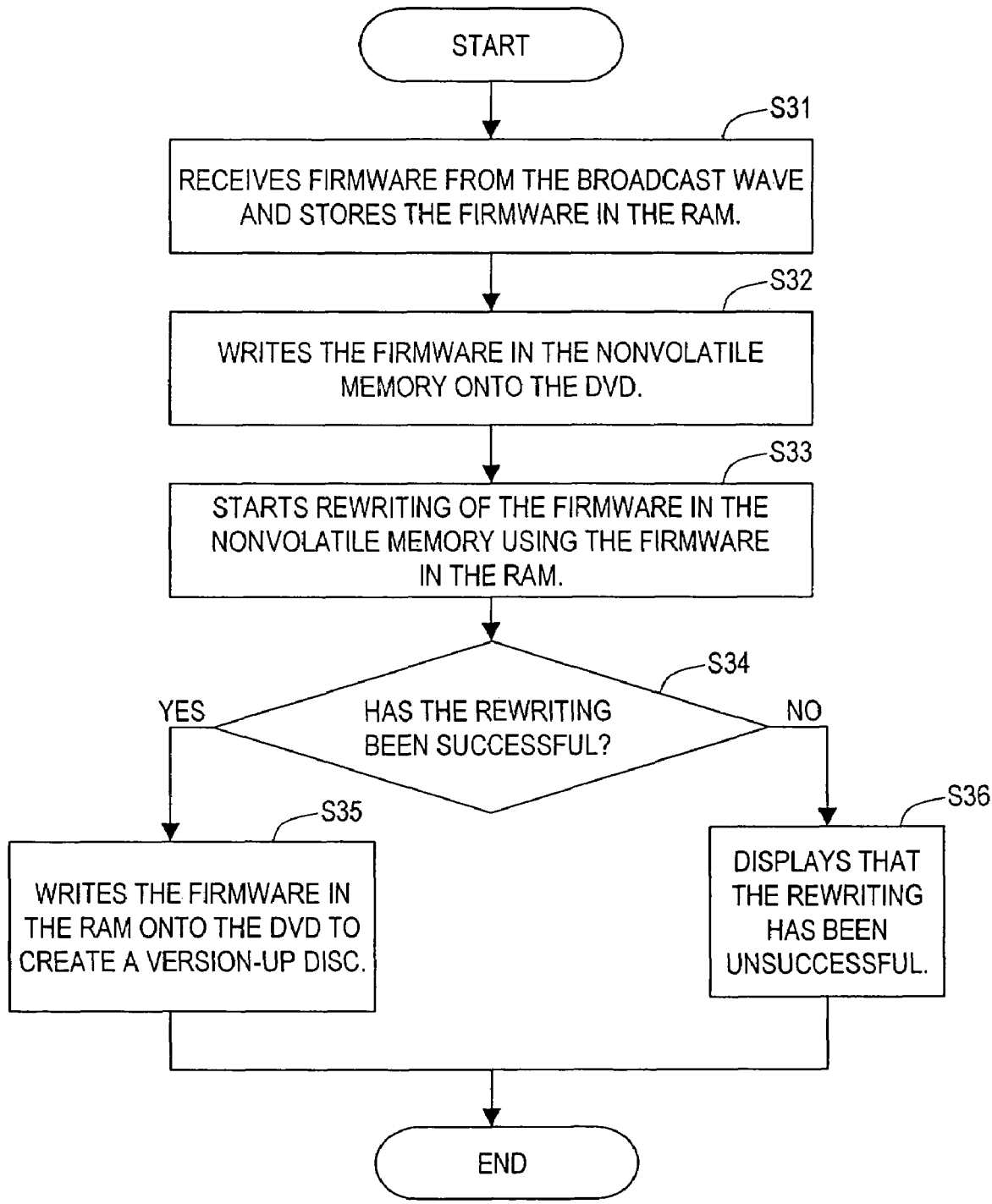
FIG. 3 is a flowchart showing a procedure of firmware update processing.

FIG. 3 shows a procedure of the firmware update processing. In the following description, it is assumed that the firmware is updated for the first time by the DVD recorder 10. It is also assumed that before updating the firmware, the DVD recorder 10 has requested the user to load a writable DVD and the user has loaded such a DVD in response to the request.

First in step S31, the receiving section 12 receives new firmware from the broadcast wave. The CPU 11 stores the firmware in the RAM 14.

Next in step S32, the CPU 11 outputs a control signal instructing the drive control unit 17 to read the firmware 2 from the nonvolatile memory 15 and to write the firmware 2 onto the DVD 5. Here, the firmware 2 is firmware set in the DVD recorder 10 at the time of shipping from the plant, which is capable of allowing the DVD recorder 10 to normally operate. In response to the control signal from the CPU 11, the drive control unit 17 sends the firmware 2 to the drive 18. Then, the drive 18 writes the firmware 2 onto the DVD 5.

Next in step S33, the CPU 11 transfers the new firmware stored in the RAM 14 to the nonvolatile memory 15 and starts rewriting of the previous firmware 2.

In step S34, the CPU 11 determines whether or not the rewriting has been successful. The determination is performed by comparing the post-rewriting firmware in the nonvolatile memory 15 and the new firmware in the RAM 14. When the comparison result shows that the two types of firmware match each other, such a result means that the rewriting has been successful. In this case, the procedure advances to step S35. By contrast, when the comparison result shows that the two types of firmware do not match each other, such a result means that the rewriting has been unsuccessful. In this case, the procedure advances to step S36.

In step S35, the CPU 11 outputs a write instruction signal to the drive control unit 17. The write instruction signal is a control signal instructing the drive control unit 17 to write the new firmware in the RAM 14 onto the DVD 5. In response to the write instruction signal from the CPU 11, the drive control unit 17 sends the new firmware in the RAM 14 to the drive 18. Then, the drive 18 writes the new firmware onto the DVD 5.

As a result of the processing performed in the steps up to step S35, the firmware in the nonvolatile memory 15 is updated and also the latest firmware at that point is stored on the DVD 5. When the recovery of the latest firmware is needed because of an inappropriate setting of the parameter by the user, for example, the normal and latest firmware can be rapidly and easily recovered using the latest firmware stored on the DVD 5.

In this embodiment, in steps S32 and S35, two different types of firmware are written both onto the DVD 5. When the firmware is rewritten with new firmware and the new firmware is found to have a bug or the like, the firmware written in step S32 can be recovered. When the new firmware itself is normal but becomes inexecutable due to a certain operation performed by the user or the like, the firmware written in step S35 can be recovered. A recovery procedure of this firmware is the same as that of the previous firmware.

Such selective recovery of the firmware is made possible by the disk control software 16-2. The disk control software 16-2 is programmed to, when it is detected that a plurality of versions of firmware are recorded on the DVD 5, cause the DVD recorder 10 to execute (i) the processing of causing the user to select either firmware and (ii) the processing of reading the selected firmware from the DVD 5 and rewriting the firmware in the nonvolatile memory 15 with the selected firmware.

In step S36, the CPU 11 outputs a signal indicating that the rewriting has been unsuccessful. Then, for example, the encoder/decoder 13 outputs a video signal displaying that "the rewriting has been unsuccessful" and an audio signal including an alarm sound. The display and the speaker (neither is shown) output the video and audio signals in order to notify the user of the failure of rewriting. Thus, the processing is terminated.

Until the processing in step S36 is terminated, the CPU 11 executes the normal firmware in the RAM 14 (i.e., the previous firmware). Therefore, the processing is terminated normally. Once the processing shown in FIG. 3 is terminated, the CPU 11 executes the new firmware in the nonvolatile memory 15.

When the new firmware is normally executed, the DVD recorder 10 can normally provide the recording function, the reproduction function and the like. However, when the new firmware is not normally executed, it is necessary to recover the previous firmware written on the DVD 5 in step S32.

This recovery is also made possible by the disk control software 16-2. When the DVD 5 is loaded into the DVD recorder 10 at the start of the DVD recorder 10 and the DVD 5 has the firmware stored therein, the disk control software 16-2 is only needed to be programmed to cause the DVD recorder 10 to write the firmware onto the nonvolatile memory 15. When the firmware update fails, the firmware cannot be executed and so the disk control software 16-2 is executed. As a result, CPU 11 outputs a read instruction signal instructing to read the firmware. In response to the read instruction signal, drive control unit 17 instructs the drive 18 to read the firmware stored on the DVD 5. Then, the drive 18 reads the firmware from the DVD 5. CPU 11 receives the firmware read from the DVD 5, and writes the firmware onto the non-volatile memory 15. Thus, the previous versions of firmware is recovered.

The processing shown in FIG. 3 is also usable for updating the firmware for the second time and thereafter, except that the processing in step S32 may be omitted by the discretion of the user in the second firmware update processing and thereafter. The reason is that because the processing in step S32 and the processing in step S35 are executed at least in the first firmware update processing, the previous firmware and also the once-updated firmware both for recovery are now available for the user.

Even if no DVD is loaded into the DVD recorder 10 at the start of the firmware update processing, the DVD recorder 10 can execute the update processing. In this case, the processing of writing the firmware onto the DVD 5 in step S35 is performed when, for example, a writable DVD is loaded for the first time after the update processing is completed. In this case, the DVD recorder 10 can display to the user a message that a version up disk will be created and write the latest firmware onto the DVD based on the selection of the user.

In this embodiment, the disk control software 16-2 is described as being stored only in the boot ROM 16. Alternatively, the CPU 11 may write the disk control software 16-2 onto the DVD 5 together with the previous firmware in step S33 and/or step S35 shown in FIG. 3. With this arrangement, when another device executable by the disk control software 16-2 becomes inoperable due to a defect in the firmware or the like, the DVD 5 can be loaded into such a device and the previous firmware can be written onto the device as long as the device can be started by the drive. Thus, the device becomes operable.

Such a manner of use means that a data processing apparatus for creating the DVD 5 having the firmware stored therein and a data processing apparatus, the firmware of which needs to be recovered, do not need to be the same. For example, the data processing apparatus for creating the DVD 5 may be a business-use recording device installed in a service center; whereas the data processing apparatus, the firmware of which needs to be recovered, may be a DVD recorder installed in the user's house. In this case, only the business-use recording device needs to execute the processing shown in FIG. 3, and the DVD recorder in the user's house does not need to execute the processing. Because a recovery disk is created using the recording device in the service center, a request for such a DVD from the user can be dealt with easily. It is also advantageous for the manufacturer in that the mailing cost, time and labor and the like for distributing the disk to service centers can be reduced.

The structure of the recording device in the service center only needs to be equivalent to that of the DVD recorder 10 shown in FIG. 2. The recording device can create a disk having the same firmware for recovery stored therein many times in repetition. Specifically, when a DVD is loaded into a recording device, the recording device writes the previous firmware or the post-update latest firmware onto the loaded DVD. When a new DVD is loaded after the first DVD is removed, the recording device writes the same firmware onto the newly loaded DVD. In this manner, any number of recovery disks can be created.

There is a possibility that the user wishes to return the firmware to the previous software. This may occur, for example, in the case where the user rewrites the previous firmware with new firmware having significantly changed functions because of the start of a new service or the like, but wishes to suspend the use of the new service for a while. In order to deal with such a wish of the user, both the new firmware after the start of the new service and the previous firmware may be distributed by a broadcast wave or the like. In this case, the new firmware and the previous firmware may be written onto the DVD only from the broadcast wave.

In the case where the manufacture puts a plurality of DVD models on market, the recording device may write a plurality of types of firmware each for the respective model onto the DVD. The reason is that DVDs are manufactured in accordance with a certain format and therefore the data in the DVD can be read by any model of DVD recorder.

The DVD recorder according to this embodiment is described as having a network update function and a media update function, but may only have the media update function. The medium, onto which the firmware executed so far by the DVD recorder is written before updating the firmware, is not limited to an optical disk such as a DVD, and may be other storage mediums (for example, a semiconductor memory card).

The present invention allows a medium for version-up of media software to be easily updated so as to have the latest version of software. Therefore, the present invention is useful for version-up of home-use electronic devices, especially devices including a central processing unit (CPU) and a non-volatile memory which has software stored therein.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-226486 filed on Aug. 3, 2004 and No. 2005-220320 filed on Jul. 29, 2005, the entire contents of which are hereby incorporated by reference.

What is claimed is:

1. A data processing apparatus, comprising:
a memory having a first firmware stored therein;
a receiving section for receiving a second firmware;
a temporary memory for temporarily storing the second firmware therein;
a processor for executing an update processing for updating the first firmware in the memory into the second firmware, wherein
before the processor executes the update processing, the drive writes the first firmware stored in the memory onto a removable storage medium;
the processor rewrites the first firmware stored in the memory with the second firmware stored in the temporary memory; and
after the execution of the update processing is completed, the processor compares the undated firmware in the memory and the second firmware in the temporary memory, and outputs a write instruction signal when the comparison result shows that the undated firmware matches the second firmware; and a drive for writing the second firmware stored in the temporary memory onto the removable storage medium,
wherein the processor selectively executes one of the first firmware and the second firmware when the first firmware and the second firmware are recorded on the removable storage medium.

2. The data processing apparatus of claim 1, wherein when the update processing into the second firmware has been successful, the processor outputs the write instruction signal, and
wherein in response to the write instruction signal, the drive writes the second firmware onto the storage medium.

3. The data processing apparatus of claim 1, wherein when the update processing into the second firmware has been unsuccessful,
wherein the processor outputs a read instruction signal,
wherein in response to the read instruction signal, the drive reads the first firmware written on the storage medium, and
wherein the processor writes the first firmware read from the storage medium, onto the memory.

4. The data processing apparatus of claim 1, wherein the receiving section receives the second firmware using at least either one of a broadcast wave and a data communication network.

5. The data processing apparatus of claim 1, wherein the drive writes the second firmware onto at least either one of an optical disk and a semiconductor memory loaded into the data processing apparatus.

6. The data processing apparatus of claim 1, wherein when the storage medium is removed from, and then a new storage medium is loaded, the data processing apparatus, the drive writes the second firmware onto the newly loaded storage medium.

7. The data processing apparatus of claim 1, wherein when a storage medium having the second firmware written thereon is loaded into the data processing apparatus, the drive reads the second firmware from the storage medium, and
wherein the processor writes the read second firmware onto the memory.

8. A method for updating a first firmware stored in a memory into a second firmware, the method comprising the steps of:
receiving the second firmware;
temporarily storing the second firmware in a temporary memory;
executing an update processing for updating the first firmware in the memory into the second firmware, wherein
before the processor executes the update processing, the first firmware stored in the memory is written onto a removable storage medium;
the first firmware stored in the memory is rewritten with the second firmware stored in the temporary memory; and
after the execution of the update processing is completed, the updated firmware in the memory is compared with the second firmware in the temporary memory, and a write instruction signal is output when the comparison result shows that the updated firmware matches the second firmware; and
writing the second firmware stored in the temporary memory onto the removable storage medium,
wherein the step of executing selectively executes one of the first firmware and the second firmware when the first firmware and the second firmware are recorded on the removable storage medium.

* * * * *